Oct. 31, 1972 P. E. TODD 3,701,566
METHOD AND APPARATUS FOR CONVEYING DUST
Filed March 9, 1970 2 Sheets-Sheet 2
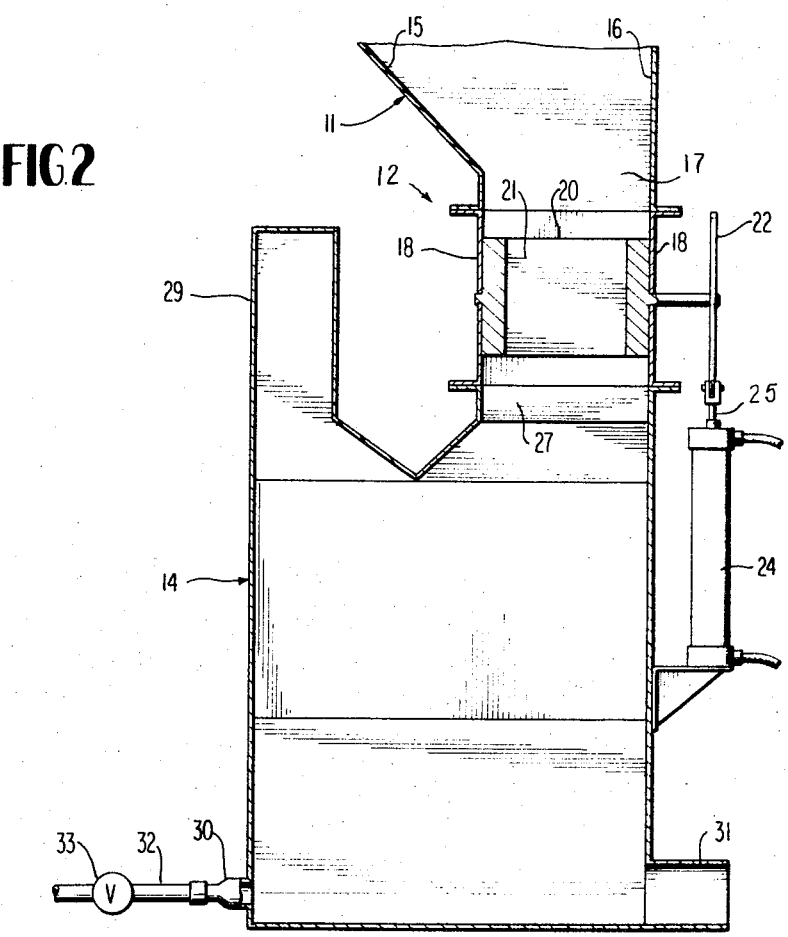
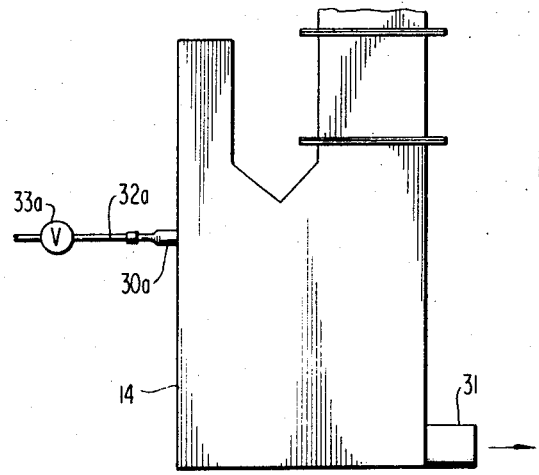
INVENTOR
PERCY E. TODD
BY *Jones & Thomas*
ATTORNEYS United States Patent Office 3,701,566
Patented Oct. 31, 1972

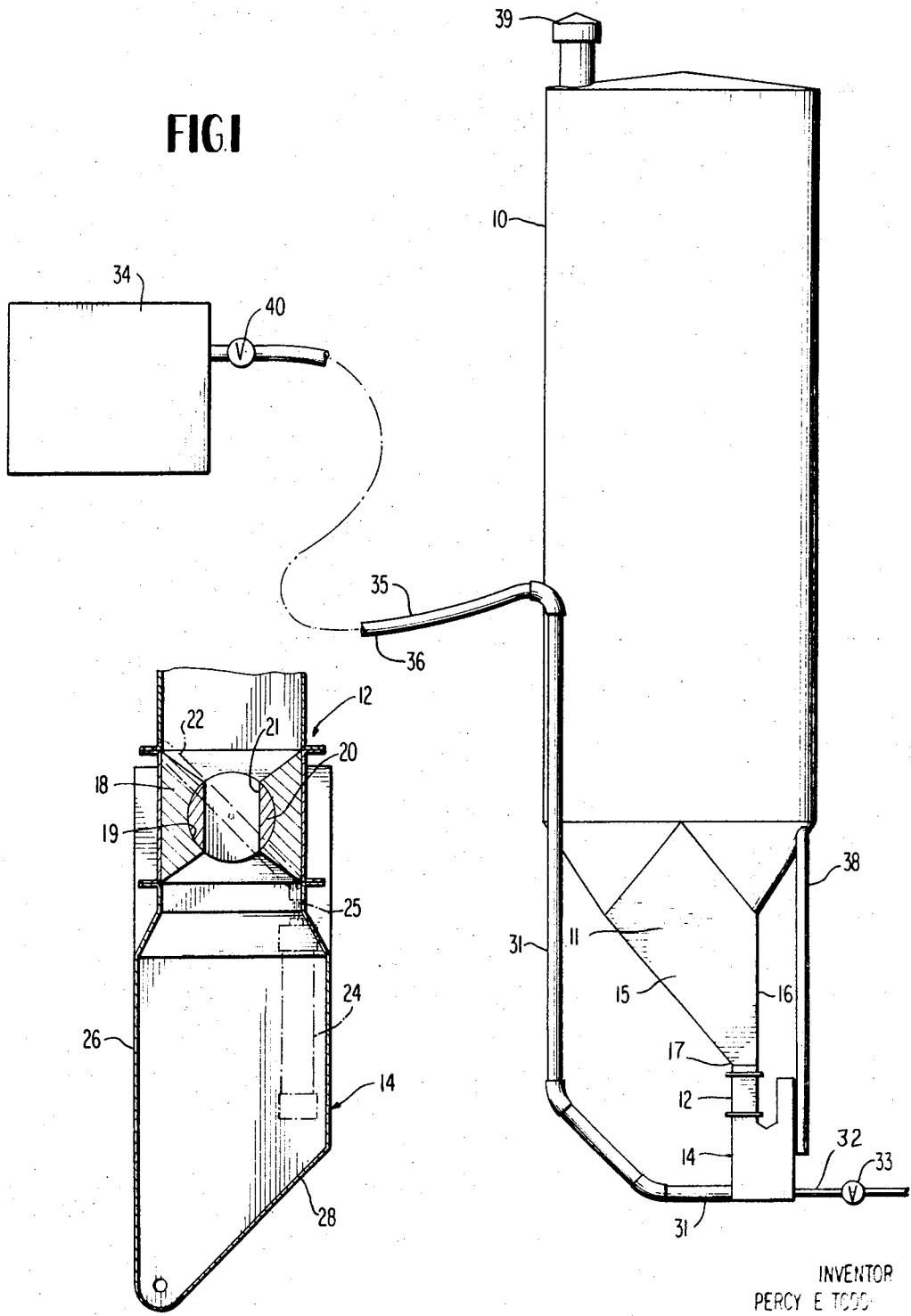

3,701,566
METHOD AND APPARATUS FOR
CONVEYING DUST
Percy E. Todd, Jackson Road, P.O. Box 1144,
Apison, Tenn. 37302
Continuation-in-part of application Ser. No. 756,820, Sept. 3, 1968, now Patent No. 3,578,814, dated May 18, 1971. This application Mar. 9, 1970, Ser. No. 17,536
The portion of the term of the patent subsequent to May 18, 1988, has been disclaimed
Int. Cl. B65g 53/12
U.S. Cl. 302—66          4 Claims

ABSTRACT OF THE DISCLOSURE

A method and apparatus for conveying fine particulate material from a storage silo at atmospheric pressure to a container or the like in which the material is transferred by gravity from the silo to a surge hopper below the silo, and pressurized air is then directed through the surge hopper and displaces the material and conveys it through a conduit to the container. The conduit includes a flow trap to assure that the particulate material is displaced by the fluid.

CROSS REFERENCE TO RELATED APPLICATION

This application is a continuation in part of application Ser. No. 756,820, filed Sept. 3, 1968 now Pat. No. 3,578,814.

BACKGROUND OF THE INVENTION

Various forms of "dust" or fine particulate material are frequently stored in a large silo or the like from which the material is dispensed and conveyed to smaller bins or equipment for packaging or processing or mixing with other materials. One important application of such is the mixing of asphalt in which the asphalt is mixed with a quantity of dust. Similar storage silos might contain cement, powdered ceramic materials, flour, grain, powdered sugar, and various other relatively fine flowable particulate materials. Since the dust has such a small particle size, bucket conveyors and comparable mechanical equipment are impractical for use in conveying the dust even over short distances.

The common solution to this problem has been to use pneumatic means to transport dust. The dust is transported through a conduit by a stream of fluid. The previous pneumatic means have required either that the entire storage silo in which the dust is stored be pressurized to urge the dust from the silo and along a conduit, or that a large volume of air be continuously passed at high velocity through a conduit into which the dust is dispensed.

When the entire silo is to be pressurized it will be obvious that the silo must be constructed so as to be able to withstand the pressure required to force the dust from the silo and through the conduit. Also, when the pressure is applied to some dust materials, only a small amount of moisture will cause the dust to cake into solid masses so that it does not flow freely from the silo.

A disadvantage of pressurizing the entire silo is that, in order to load the silo with dust, the pressure must be removed, the dust loaded into the silo, and the pressure again built up. This entails a considerable amount of down-time which is very expensive since no dust can be dispensed from the silo while the silo is inoperable.

In the systems in which dust is fed into a continuously moving stream of air, a large amount of pressurized air is required, which requires a large-capacity compressor. Also, a large volume of air is required to entrain only a small percentage of dust. This requires a long time to deliver a given amount of dust, the large volume of air must be separated from the dust, and it is difficult to determine how much dust has been delivered due to the quantity of air entraining the dust.

Asphalt is normally mixed in batches of a given size, which requires dust in batches of a given size; and, in mixing asphalt, it is important to receive the dust at a critical time and to dispense the completed mix at a critical time. Therefore, if the required amount of dust be delivered over a long period of time, the entire process is disturbed. This, also, makes it undesirable to receive the dust entrained in a great quantity of air.

BRIEF DESCRIPTION OF THE INVENTION

The apparatus and method of the present invention overcome the above mentioned and other difficulties inherent in the prior art devices by providing a batch conveying system in which dust or fine particulate material is taken from a storage silo as a batch, then either a desired portion of that batch or the entire batch is conveyed by air with the dust comprising a large percentage of the flowing mass.

In general terms the present invention includes a surge container or hopper below a dust storage silo in selective communication with the silo through a gate. The storage silo is maintained at generally atmospheric pressure while a source of pressurized fluid is connected to the surge hopper to pressurize the conveying system, and a delivery conduit is connected to the surge hopper for delivery of the material.

In operation, the gate is opened to allow a quantity of dust to pass into the surge hopper and the gate is closed to seal the surge hopper from the silo. Fluid under pressure is then admitted to the surge hopper to urge the dust from the surge hopper and through the delivery conduit. Anytime the source of pressurized fluid is cut off from the surge hopper, the delivery of dust will terminate so that any portion of the dust that is in the surge hopper can be delivered. Also, the delivery conduit may have a valve at the delivery end so that the flow can be controlled either by turning off the source of pressurized fluid or by closing off the delivery conduit.

These and other features and advantages of the present invention will become apparent from consideration of the following specification when taken in conjunction with the accompanying drawings.

BRIEF DESCRIPTION OF THE DRAWING

FIG. 1 is a side elevational view showing a delivery system embodying the present invention;

FIG. 2 is an enlarged vertical cross-sectional view of the surge hopper of the apparatus of FIG. 1;

FIG. 3 is a vertical cross-sectional view, taken at right angles with respect to FIG. 2, of the surge hopper; and FIG. 4 is a side elevational view, similar to FIG. 2, showing an alternate form of the invention.

DESCRIPTION OF THE PREFERRED EMBODIMENT

Referring now in more detail to the drawing in which like numerals indicate like parts throughout the several views, FIG. 1, shows storage silo 10 which comprises a substantially upright cylindrical container normally supported on support legs (not shown), and which includes a converging bottom wall section 11. Cut off valve or gate 12 is positioned below bottom wall section 11, and surge hopper 14 is located below cut off valve 12. Converging bottom wall section 11 of hopper 10 comprises two inclined walls 15 and two generally vertical walls 16 which form outlet 17 at their lower portions. Dust or fine particulate matter is to be stored in silo 10, and the dust flows by gravity from the upper portion of the silo down toward its bottom wall section 11. The vertical walls 16 do not provide a lateral surface upon which the dust can rest and tend to bridge over to one of the inclined walls 15, thus the dust will not bridge or arch over the outlet 17 of silo 10.

As is best illustrated in FIGS. 2 and 3, cut off valve 12 includes valve housing 18 that defines a cylindrical valve seat 19, and cylindrical valve element 20 is supported in the valve seat. The cylindrical valve element 20 is rotatable about a horizontal axis within valve housing 18, and valve opening 21 extends through the valve element.

Handle 22 is connected externally of valve housing 18 to valve element 20, and air cylinder 24 has its connecting rod 25 connected to handle 22 in an arrangement where the operation of air cylinder 24 causes valve opening 21 to move between a vertically oriented open position as illustrated in FIG. 3 and a horizontally oriented closed position (not shown).

Surge hopper 14 communicates at its upper end through its dust inlet opening 27 with valve element 20 and comprises a central generally rectangular housing 26 with one sloping bottom wall 28. As is illustrated in FIG. 2, air plenum chamber 29 communicates with the upper portion of housing 26 and extends in an upward direction and is positioned generally above dust inlet opening 27. As an alternative, the desired air plenum chamber 29 may also be formed by providing a partial partition inside and at the top of surge hopper 14 which would permit entrapment of air but prevent the entry of dust or other fine material being handled.

Bell reducer 30 is connected to one side of housing 26 of surge hopper 14, and delivery conduit 31 is connected to the other side of housing 26. Delivery conduit 31 is located at the lower portion of housing 26, generally at the bottom of sloping bottom wall 28 and generally in alignment with bell reducer 30. An air supply conduit 32 is connected to bell reducer 30, and an on-off valve 33 is positioned in air supply conduit 32. A source of pressurized air (not shown) is connected to the other end of air supply conduit 32, and valve 33 controls the flow of air through conduit 32.

Delivery conduit 31 turns in an upward direction as it leaves surge hopper 14 and extends up the exterior wall of silo 10. Delivery conduit 31 connects surge hopper 14 to bin 34 by means of flexible conduit section 35. Bin 34 may be an asphalt plant pug mill, a weigh hopper of a pug mill, or any of the containers for receiving fine particulate matter, suuch as cement, filler dust, powdered ceramic materials, flour, grains, or powdered sugar. Flexible section 35 can be a rigid section if desired; however, it has been found that the use of a flexible section 35 of delivery conduit 31 provides a flow trap 36 that is desirable in moving the dust in the manner as prescribed herein.

In order to initially load silo 10 with dust, loading conduit 38 is provided which extends in an upward direction from adjacent the ground level to near the upper portion of silo 10. Air vent 39 opens silo 10 to the atmosphere.

A secondary flow control valve 40 is positioned in delivery conduit 31 adjacent bin 34 and functions to open and close communication between delivery conduit 31 and bin 34.

OPERATION

When dust or fine particulate matter is to be delivered from a large source of supply to associated equipment, such as an asphalt pug mill or any automated production system, silo 10 can be utilized with such a system. The dust to be stored in silo 10 is delivered by truck or similar vehicle and the dust is normally transferred to the silo by pressurizing the tank of the vehicle and flowing the dust with a flow of air through loading conduit 38. The dust will enter silo 10 near the top of its chamber, and is diverted in a downward direction within the silo. The air displaced by the inflow of dust and air will be vented through air vent 39 to the atmosphere. After silo 10 has been filled in this manner, its capacity is usually sufficient by comparison to bin 34 so that frequent refilling of silo 10 is not necessary.

When the dust from silo 10 is to be delivered through delivery conduit 31, air cylinder 24 is actuated to rotate valve element 20 (FIG. 3) to its open position, and dust flows from the lower portion of silo 10 through valve 12 into surge hopper 14. As is illustrated in FIG. 1, the dust enters surge hopper 14 adjacent one end thereof and normally flows toward the bottom of the housing 26. The sloping bottom wall 28 guides the dust toward the narrow bottom of the surge hopper. Since surge hopper 14 is generally air tight, the air within surge hopper 14 is slightly compressed as the dust enters the surge hopper. Since the dust is more dense than the air the dust flows to the bottom of the surge hopper and the air moves in an upward direction and generally enters air plenum chamber 29. Since air plenum chamber 29 is located above dust inlet opening 27 or is formed by partitioning to prevent entry of dust into air plenum chamber 29, the dust flowing through cut off valve 12 generally will not enter air plenum chamber 29. With this arrangement, the air previously present within surge hopper 14 does not inhibit the downward flow of dust through cut off valve 12 and toward the lower portion of surge hopper 14.

After surge hopper 14 is substantially filled with dust, air cylinder 24 moves to its opposite position to rotate valve element 20, which closes cut off valve 12 and substantially seals surge hopper 14 from silo 10. This also substantially seals surge hopper 14 since the opening to delivery conduit 31 is covered with dust. Valve 33 is then opened to connect the pressurized source of air (not shown) with the lower portion of surge hopper 14. Since bell reducer 30 is generally in alignment with delivery conduit 31, the inflow of air to the lower portion of surge hopper 14 acts as a ram or piston and causes a slug of dust to flow from surge hopper 14 into and through delivery conduit 31. After the initial slug of dust has been forced out of surge hopper 14, the mass of dust above the delivery conduit 31 within surge hopper 14 drops down into alignment with delivery conduit 31 so that the dust remaining within surge hopper 14 will flow through delivery conduit generally in slugs and also in entrainment with the air flowing from surge hopper 14 through the delivery conduit. When the dust reaches the flexible portion 35 of delivery conduit 31, the trap 36 formed by the catenary of the flexible conduit will inusre that the initial mass of flowing dust remains in the form of a slug with a large percentage of dust and a small percentage of air forming the mass of flowing material by comparison to a conventional air flow system. The subsequent flowing mass of material reaching the trap 36 will also tend to pass through the flexible portion of the conduit as a slug because of the flow characteristics created by the trap. If desirable, several traps 36 can be created in flexible conduit 35 in order to create the desired flow characteristics for a particular system.

After substantially all of the dust from surge hopper 14 has been delivered to bin 34, valve 33 will be closed to terminate the flow of air through surge bin 14, and the pressure within surge hopper 14 will return to about atmospheric pressure by the dissipation of the air flowing through delivery conduit 31. At this point, the process can be repeated. In some systems where a large amount of dust is required to be delivered to bin 34 in compliance with the function being carried on at the bin, several cycles of surge hopper 14 may be required in short time intervals. If this is the case, the alternate operation of cut off valve 12 and air supply valve 33 will function to supply a relatively large mass of dust and a relatively small quantity of air to bin 34 in a short time. Moreover, if less than one batch of dust is needed from surge hopper 14, valve 33 can be operated for a shorter period of time than necessary to convey the entire batch of dust. Also, the secondary flow control valve 40 (FIG. 1) can be operated to terminate the flow of dust through delivery conduit 31 before the entire batch of dust has been dispensed, if desired.

Under normal circumstances, the internal dimensions of surge hopper 14 will be chosen to correspond with the desired batch size which can be delivered to bin 34 since it is desirable to deliver an entire batch at a time; however, the system can function effectively to deliver less than a whole batch, or to deliver several batches in succession.

While the invention has been disclosed as having the air inlet of surge hopper 14 in alignment with the delivery conduit, FIG. 4 illustrates a form of the invention where the air inlet is located above the delivery conduit 31. This embodiment of the invention is desirable when a very fine and highly flowable particulate material or dust is to be conveyed. The air flowing into surge hopper 14 can enter above the entire mass of dust, in a manner similar to a pneumatic displacement pump, so that a high pressure is created above the dust within surge hopper, and the dust flows out the bottom of the surge hopper. When heavier dust is being conveyed, it may be necessary to generate a flow toward delivery conduit 31, as by placing the air inlet in alignment with the delivery conduit, as shown in FIG. 2. With this arrangement, the initial flow of dust from surge hopper 14 is in the form of a slug of dust displaced from the surge hopper by the air with only a small amount of air mixed in the slug, while the following mass of flow may comprise a higher percentage of air.

Since the present invention delivers a high percentage of dust in an air dust mixture, it is only necessary to separate the smaller amount of air from the dust at the delivery point to get the dust back into its usable form. Moreover, there is a smaller amount of air exhausted back to the atmosphere, which means that a smaller amount of dust is carried to the atmosphere as an air pollution hazard.

While this invention has been described in detail with particular reference to preferred embodiments thereof, it will be understood that variations and modifications can be effected with the spirit and scope of the invention as described hereinbefore and as defined in the appended claims.

I claim:

1. A method of conveying fine dry particulate material through a delivery conduit comprising flowing the material from a storage silo at approximately atmospheric pressure into the lower portion of a surge container below the storage silo, flowing the air displaced by the material from the lower portion of the surge container into a plenum chamber in open communication with the upper portion of the surge container, sealing the surge container and plenum chamber from the storage silo, directing a flow of air across the lower portion of the surge container toward the delivery conduit until substantially all of the particulate material has been discharged from the surge container through the delivery conduit, terminating the air flow to the surge container, dissipating the air pressure from the surge container and plenum chamber through the delivery conduit until the air pressure in the surge container is generally the same as the air pressure in the storage silo, and flowing the particulate material through a flow trap in the delivery conduit.

2. The method of claim 1 wherein the step of flowing the air displaced from the lower portion of the surge container into a plenum chamber is characterized by flowing the air to a plenum chamber positioned above the surge container.

3. The method of claim 1 and wherein the step of directing a flow of air across the lower portion of the surge container comprises pneumatically displacing a portion of the particulate material from the surge container into the delivery conduit.

4. The method of claim 1 and wherein the step of flowing the air displaced by the material from the lower portion of the surge container into a plenum chamber comprises flowing the air to a level above where the material enters the surge hopper.

References Cited

UNITED STATES PATENTS

| | | | |
|---|---|---|---|
| 951,754 | 3/1910 | Buzzell | 302—55 |
| 1,585,549 | 5/1926 | Jorgensen | 302—55 |
| 2,907,606 | 10/1959 | Caldwell | 302—53 |
| 3,578,814 | 5/1971 | Todd | 302—53 |
| 1,131,951 | 3/1915 | Parsons | 302—52 |
| 2,740,153 | 4/1956 | Bishop | 302—64 |
| 3,093,364 | 6/1963 | Schoonover | 302—64 |
| 1,160,283 | 11/1915 | Hay | 302—57 |
| 2,534,807 | 12/1950 | Allen | 302—52 |

RICHARD E. AEGERTER, Primary Examiner

W. S. CARSON, Assistant Examiner

U.S. Cl. X.R.

302—40, 53, 55